United States Patent
Jung et al.

(10) Patent No.: US 8,110,947 B2
(45) Date of Patent: Feb. 7, 2012

(54) UNINTERRUPTIBLE POWER SUPPLY WATCHDOG SYSTEM AND AUTO RECOVERY METHOD USING THE SYSTEM

(75) Inventors: Hyun Chul Jung, Seoul (KR); Dong Sung Park, Seongnam-si (KR)

(73) Assignee: KT Corporation, Sungnam-si (KR)

( * ) Notice: Subject to any disclaimer, the term of this patent is extended or adjusted under 35 U.S.C. 154(b) by 329 days.

(21) Appl. No.: 12/465,584

(22) Filed: May 13, 2009

(65) Prior Publication Data

US 2009/0224605 A1    Sep. 10, 2009

Related U.S. Application Data

(63) Continuation of application No. PCT/KR2007/005713, filed on Nov. 14, 2007.

(30) Foreign Application Priority Data

Nov. 14, 2006  (KR) .................... 10-2006-0112150

(51) Int. Cl.
*H02J 7/00* (2006.01)
*H02J 9/00* (2006.01)

(52) U.S. Cl. ............................. 307/66; 307/65
(58) Field of Classification Search ............. 307/65–66
See application file for complete search history.

(56) References Cited

FOREIGN PATENT DOCUMENTS

| | | | |
|---|---|---|---|
| JP | 62-285638 A | 12/1987 | |
| JP | 02-055541 A | 2/1990 | |
| JP | 03-015235 A | 1/1991 | |
| JP | 08-280143 A | 10/1996 | |
| JP | 09-163361 A | 6/1997 | |
| JP | 10-052053 A | 2/1998 | |
| KR | 10-2004-0042529 A | 5/2004 | |
| KR | 10-2006-0008007 A | 1/2006 | |
| KR | 10-2006-0065181 A | 6/2006 | |
| KR | 10-2006-0107435 A | 10/2006 | |

OTHER PUBLICATIONS

Nagata Takato, Method of automatically switching power feed route to inverter from commercial power supply; Oct. 4, 1995; Abstract, Specification, Drawings.*
International Search Report Dated Feb. 26, 2008 in PCT Application No. PCT/KR2007/005713, which is the parent application of this application—3 pages.
Written Opinion Dated Feb. 26, 2008 in PCT Application No. PCT/KR2007/005713, which is the parent application of this application—4 pages.

* cited by examiner

*Primary Examiner* — Dharti Patel
(74) *Attorney, Agent, or Firm* — Knobbe Martens Olson & Bear LLP

(57) ABSTRACT

According to the present invention, provided is a watchdog system for Uninterruptible Power Supply (UPS), and auto recovery method using the same. In case the power supply path of UPS is switched from the normal power line to the bypass line, the UPS watchdog system of the present invention is firstly compulsively recovers again the power supply path to the normal power line for given times and, nevertheless, in case it is not recovered, the power is supplied through the bypass line. Accordingly, in case the power supply path is switched to the bypass line due to the temporary disorder of UPS, it can be rapidly recovered to the normal power path, so that the power supply by the UPS apparatus can be more stably performed.

11 Claims, 5 Drawing Sheets

UNINTERRUPTIBLE POWER SUPPLY WATCHDOG SYSTEM AND AUTO RECOVERY METHOD USING THE SYSTEM

TECHNICAL FIELD

The present invention relates to the Uninterruptible Power Supply (UPS), more particularly, to the UPS watchdog system and auto recovery method using the same, which determines whether a failure is temporary or not in case a power supply path is switched to a bypass line due to an unusual condition of UPS, and rapidly recovers the disabled power supply path to the normal power line in case a corresponding failure is temporary.

BACKGROUND ART

Typically, the UPS is designed with a view to steadily supplying the power having a constant voltage and frequency to a load even when a power failure is occurred in the common power source without notice or an input power is not constant.

FIG. 1 is a drawing that shows the configuration of an uninterruptible power supply (UPS) of the related art.

In a normal mode, in case an alternating current (AC) power is inputted to UPS through a switch CB1, the inputted alternating current (AC) power is transformed from a rectifier 1 to a direct current (DC) power, and then, it is supplied to an inverter 2 and is charged in a battery 3. The inverter 2 converts again the output power of the rectifier 1 into the alternating current to provide to a load. At this time, an output breaker CB3 is ON, while the switch STS, CB4 of a bypass module 4 is OFF. At this time, in case the input power is blocked due to the power failure, the DC power which is charged in the battery 3 is transformed into the AC power by the inverter 2 and the transformed AC power is supplied to a load. The path in which the input power or the DC power of the battery 3 is supplied through the inverter 2 is called as normal power line.

However, in case a malfunction of the inside of UPS or a momentary short circuit of the outside of UPS is generated while the input power is normally inputted, the electric power supply through the normal power line may be impossible. In this case, the control means (not shown) of the UPS blocks off the normal power line by making the output breaker CB3 to be OFF. The control means (not shown) changes the power supply path from the normal power line to the bypass line by making the switch STS, CB4 of the bypass module 4 to be ON. Accordingly, the input power is immediately supplied to a load through the bypass line. At this time, the switch CB4 of the bypass module 4 is applied with ON signal simultaneously with the static switch STS, and immediately being turned on after the static switch STS is turned on.

In case the power supply path is switched to the bypass line, a user checks out the unusual condition of UPS. When the check out is completed, the electric power supply is manually changed as 'inverter first'. Therefore, the power is supplied again to a load through the normal power line.

In case of conventional UPS, an artificial operation of a user is required in order that the power supply path is switched again to the normal power line after switching to the bypass line.

Of course, the switching to the bypass line in the UPS can be generated when a really important failure is generated in the normal power line. However, it also can be generated by a temporary control failure of the inside of UPS or a temporary external load short circuit. After the switching to the bypass line, the process of checking out by a user and manual switching to the normal power line should be completed. Therefore, there is a problem in that too much time is required for the recovery procedure even when a temporary control failure or a temporary external load short circuit is occurred. Furthermore, if the failure of the bypass line is generated during such recovery procedure, there is a problem that the power supply for the load is completely blocked.

DISCLOSURE

Technical Problem

Accordingly, an object of the present invention is to solve at least the problems and disadvantages of the related art. The object of the present invention is to provide a UPS apparatus capable of steadily supplying power by rapidly recovering to a normal power path in case a power supply path is switched to a bypass line due to a temporary failure of UPS.

Technical Solution

In order to accomplish the object, according to an aspect of the present invention, provided is an UPS watchdog system that compulsively recovers a power supply path to a normal power line as much as a preset number, in case the power supply path of UPS is switched from the normal power line to a bypass line.

According to another aspect of the present invention, provided is an UPS watchdog system comprising an inverter-on generating unit that generates an inverter-on signal for turning on an inverter of an UPS in case a bypass signal is generated; a recovery signal generating unit that generates a recovery signal for changing the power supply path from the bypass line to the normal power line according to the bypass signal, the inverter-on signal and a recovery stop signal; a counter unit that outputs an accumulation count signal of the magnitude corresponding to the number of occurrence of the recovery signal; a counting comparison unit that generates a counting comparison signal in case the magnitude of the accumulation count signal is greater than a preset reference value; and a recovery stop unit that controls the generation of a reset signal for stopping the recovery stop signal and the counting of the counter unit according to the counting comparison signal and the accumulation count signal.

According to still another aspect of the present invention, provided is an UPS auto recovery method comprising a first step of determining whether a power supply path of an UPS is switched from a normal power line to a bypass line; a second step of turning on an inverter of UPS and switching again the power supply path to the normal power line, in case the power supply path is switched to the bypass line; and a third step of repeatedly performing the first and the second step until the number of switching to the bypass line reaches a preset number.

ADVANTAGEOUS EFFECTS

The present invention is to provide a UPS apparatus capable of steadily supplying power by rapidly recovering to a normal power path in case a power supply path is switched to a bypass line due to a temporary failure of UPS.

BEST MODE

The embodiment of the present invention will be illustrated in detail with reference to attached drawings.

Figure 2:
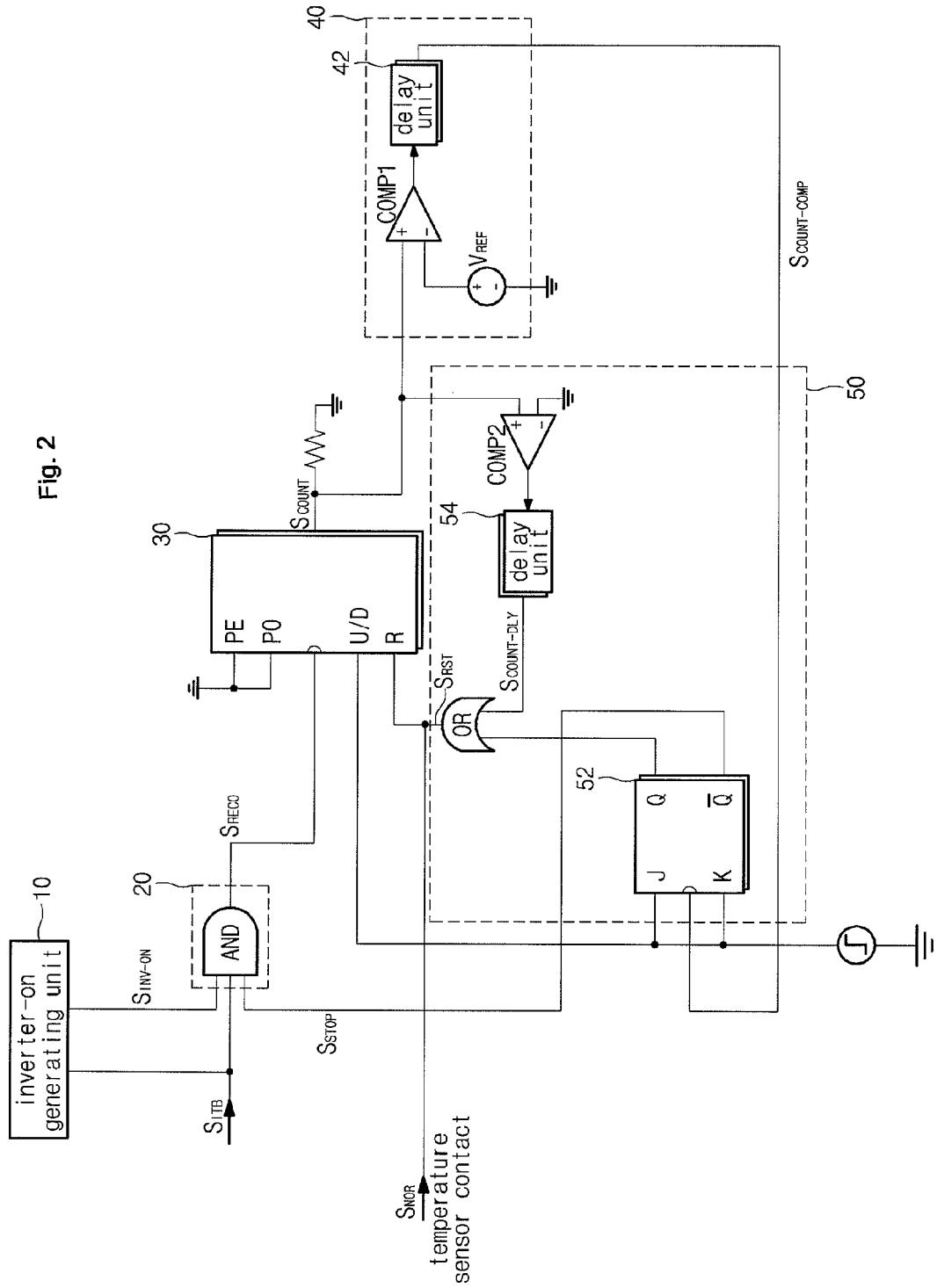
FIG. 2 is a diagram showing the configuration of an UPS watchdog system according to the present invention.

FIG. 2 is a diagram showing the configuration of an UPS watchdog system according to the present invention.

The UPS watchdog system of FIG. 2 provides an inverter-on generating unit 10, a recovery signal generating unit 20, a counter unit 30, a counting comparison unit 40 and a recovery stop unit 50.

The inverter-on generating unit 10 outputs the inverter-on signal $S_{INV-ON}$ for turning-on the inverter 2 when a preset given time elapses, in case a bypass signal $S_{ITB}$ for switching the power supply path from a normal power line to a bypass line is generated when the UPS has a failure. That is, in case the power supply path is switched from the normal power line to the bypass line, the inverter-on generating unit 10 automatically generates an inverter-on signal $S_{INV-ON}$ when the bypass signal $S_{ITB}$ is generated in order to confirm whether such switching is caused by a temporary abnormal occurrence.

The recovery signal generating unit 20 outputs the recovery signal $S_{RECO}$ for returning the power supply path from the bypass line to the normal power line according to the bypass signal $S_{ITB}$, the inverter-on $S_{INV-ON}$ and the recovery stop signal $S_{STOP}$ which will be mentioned later. Such recovery signal generating unit 20 includes a AND gate having the bypass signal $S_{ITB}$, the inverter-on signal $S_{INV-ON}$ and a recovery stop signal $S_{STOP}$ as input signal.

The counter unit 30 outputs the accumulation count signal $S_{COUNT}$ that counts the output signal of the recovery signal generating unit 20, that is, the number of occurrence of the recovery signal $S_{RECO}$ and has the magnitude corresponding to the number of generating the recovery signal $S_{RECO}$. In the present embodiment, the up-counter is used as counter unit 30. The counter unit 30 increases the magnitude of the accumulation count signal $S_{COUNT}$ as much as a predetermined amount (for example, 1V) to output whenever the recovery signal $S_{RECO}$ is generated. For example, the counter unit 30 outputs the accumulation count signal $S_{COUNT}$ which has the magnitude of 1V when the recovery signal $S_{RECO}$ is once generated, thereafter, when the recovery signal $S_{RECO}$ is again generated, it outputs the accumulation count signal $S_{COUNT}$ which has the magnitude of 2V (1V+1V). The counter unit 30 is to be reset when a normal operation signal $S_{NOR}$ or a reset signal $S_{RST}$ from the recovery stop unit 50 is applied, and discontinues a count.

The counting comparison unit 40 outputs the counting comparison signal $S_{COUNT-COMP}$ in case the magnitude of the accumulation count signal $S_{COUNT}$ becomes larger than a reference value $V_{REF}$ by comparing the magnitude of the accumulation count signal $S_{COUNT}$ with a preset reference value $V_{REF}$. At this time, the magnitude of the reference value $V_{REF}$ is settled depending on how many times the watchdog system of the present invention implements repair operation in UPS in the abnormal occurrence. That is, since the magnitude of the accumulation count signal $S_{COUNT}$ is increased in proportion to the number of occurrence of the recovery signal $S_{RECO}$, in case the reference value $V_{REF}$ is set up between 2V~3V, the counting comparison signal $S_{COUNT-COMP}$ is generated when the recovery signal $S_{RECO}$ is generated three times. This counting comparison unit 40 includes a comparator COMP1 that outputs the counting comparison signal $S_{COUNT-COMP}$ by comparing the magnitude of the accumulation count signal $S_{COUNT}$ with the preset reference value $V_{REF}$, and a delay unit 42 that makes a time delay of the output signal $S_{COUNT-COMP}$ of the comparator COMP1 to output to the recovery stop unit 50.

The recovery stop unit 50 selectively stops the auto recovery operation of the present invention and the counting operation of the counter unit 30 according to the counting comparison signal $S_{COUNT-COMP}$. That is, when the counting comparison signal $S_{COUNT-COMP}$ is generated, the recovery stop unit 50 determines that the failure of UPS is not a temporary failure but a serious failure, and generates the recovery stop signal $S_{STOP}$. The recovery stop signal $S_{STOP}$ is applied to the recovery signal generating unit 20 and stops the occurrence of the recovery signal $S_{RECO}$. Further, the recovery stop unit 50 outputs the signal of high level to one of input terminal of the OR-gate and generates the reset signal $S_{RST}$. Furthermore, in case the recovery signal $S_{RECO}$ is not generated as much as the preset times for a predetermined time (for example, three minutes), the recovery stop unit 50 determines this as a normal state and generates the reset signal $S_{RST}$ to stop the counting operation of the counter unit 30. This recovery stop unit 50 provides a J/K flip flop 52 that outputs the differential signal(Q, $\overline{Q}$) according to the counting comparison signal $S_{COUNT-COMP}$, a comparator COMP2 that senses the generation of the accumulation count signal $S_{COUNT}$ and changes it into a rectangular wave to output, a delay unit 54 that delays the output signal of the comparator COMP2 for a given time, and a OR-gate that outputs the reset signal $S_{RST}$ when at least one signal is generated among any one differential signal(Q) of J/K flip flop 52 and a delay count signal $S_{COUNT-DLY}$ from the delay unit 54.

Figure 3:
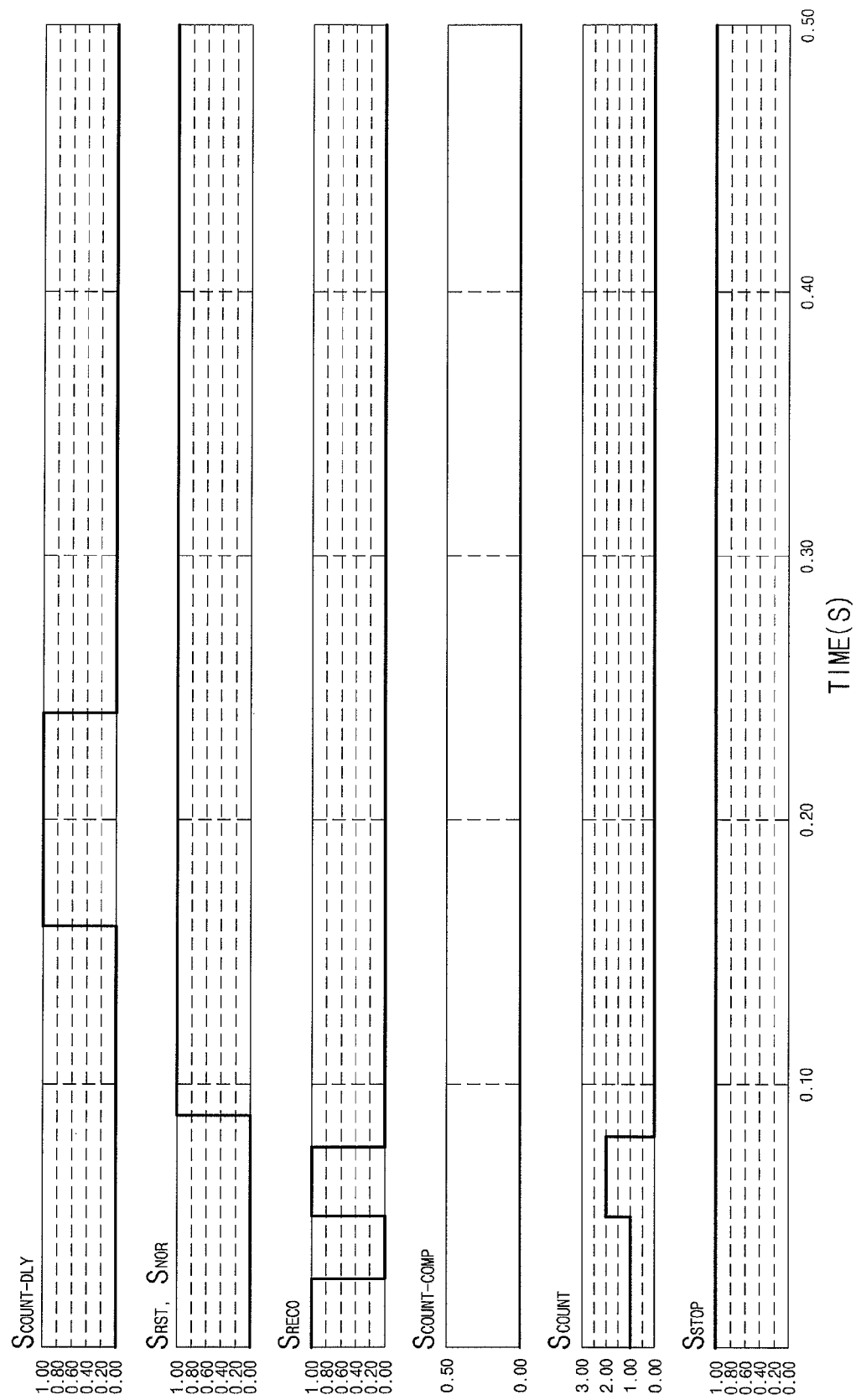
FIG. 3 is a timing diagram showing the auto recovery operation according to the present invention, in case the failure of UPS is temporary.
Figure 4:
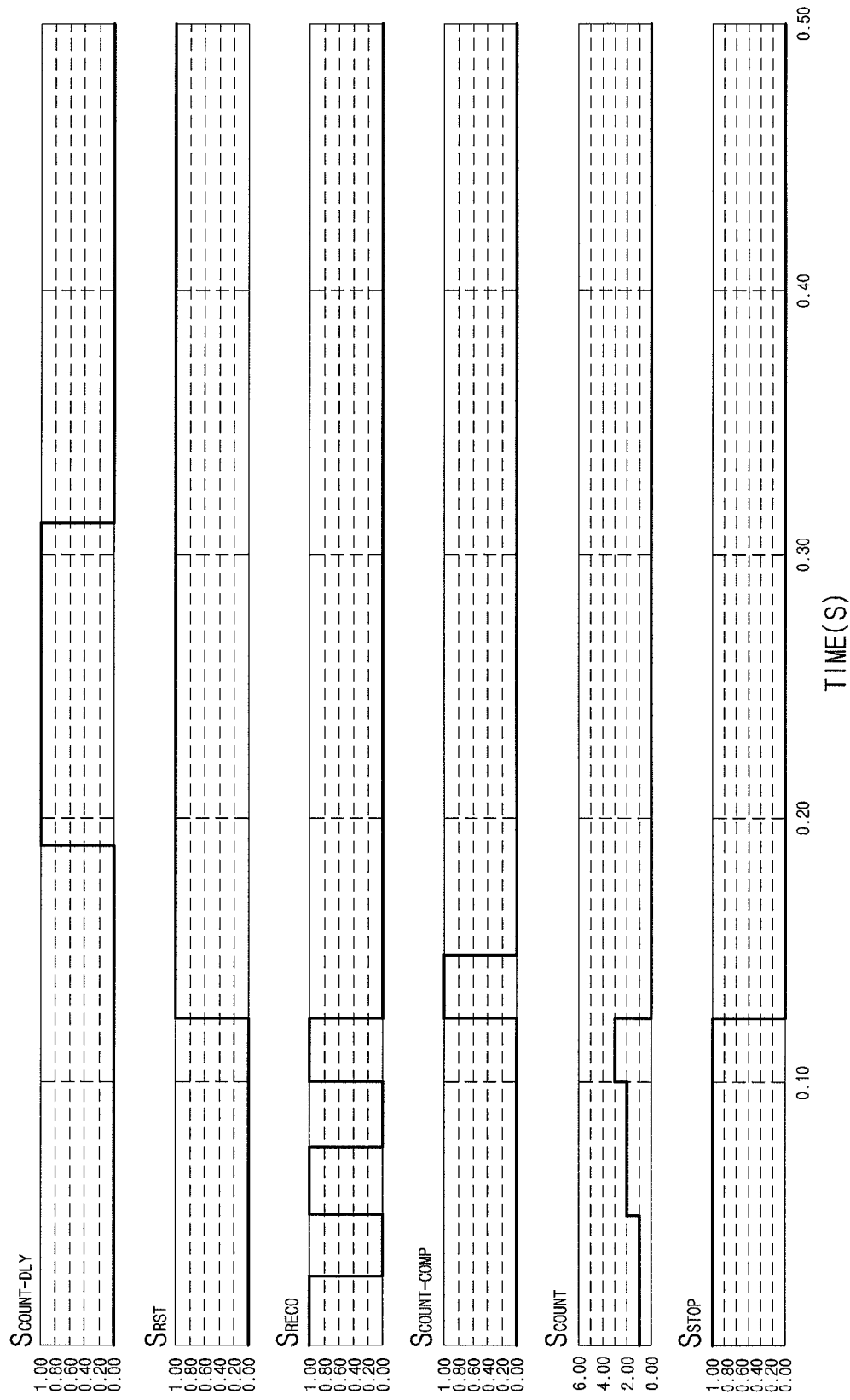
FIG. 4 is a timing diagram showing the auto recovery operation process according to the present invention, in case the recovery signal SRECO is consecutively generated three times.
Figure 5:
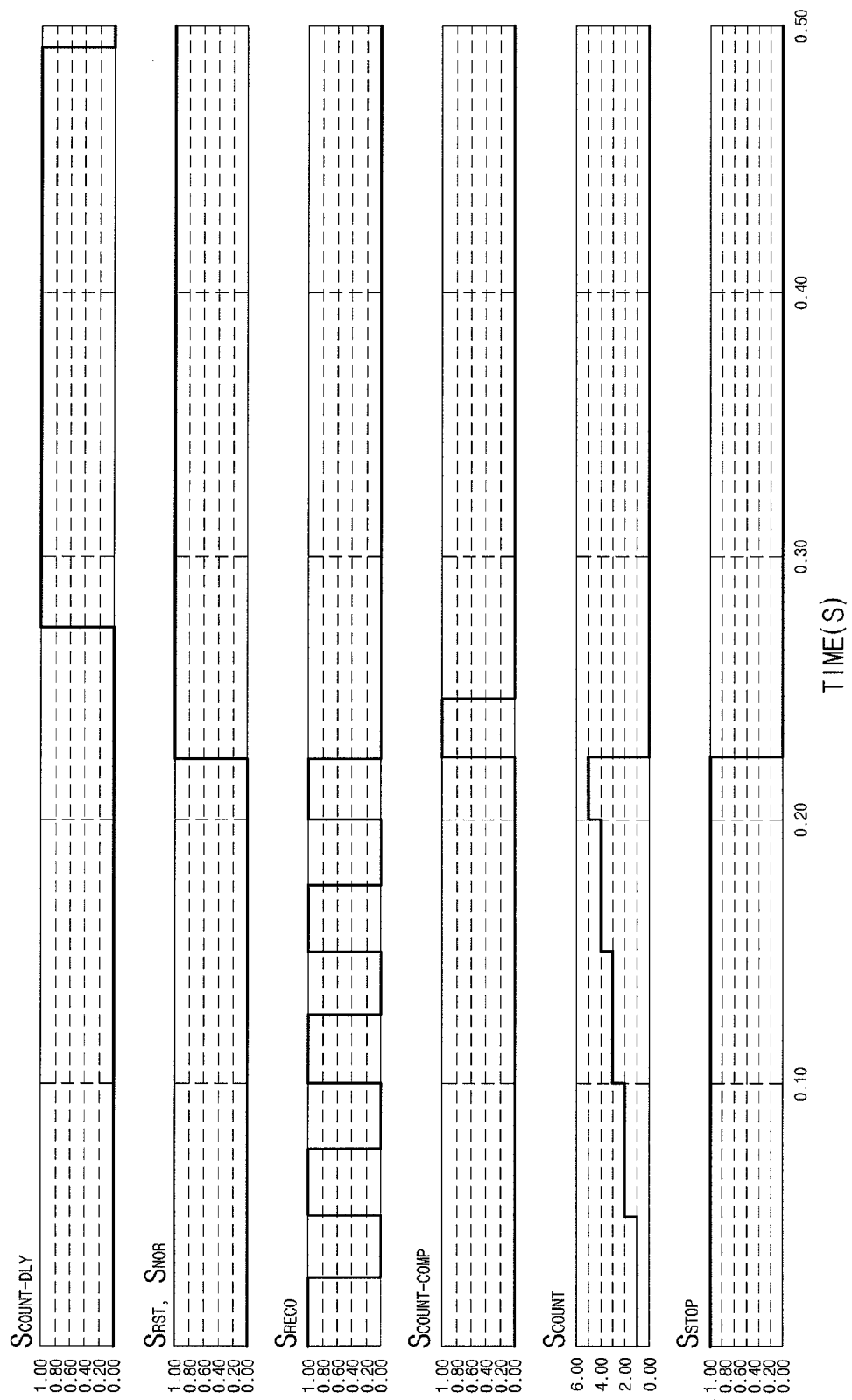
FIG. 5 is a timing diagram showing the auto recovery operation process according to the present invention, in case the recovery signal SRECO is consecutively generated five times.

FIG. 3 to FIG. 5 are a timing diagram showing the operation of watchdog system according to the present invention.

FIG. 3 is a timing diagram showing the auto recovery operation according to the present invention, in case the failure of UPS is temporary.

Figure 1:
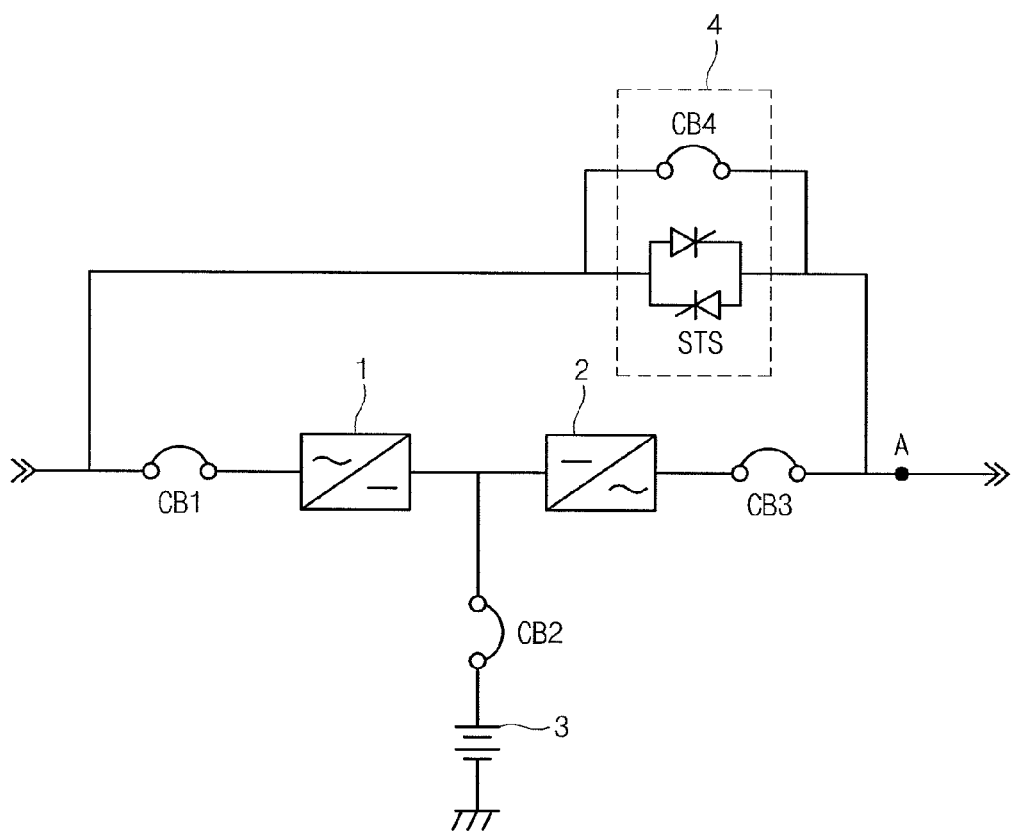
FIG. 1 is a diagram showing the configuration of an uninterruptible power supply (UPS) of the related art.

As mentioned in FIG. 1, in case the malfunction of the inside of UPS or the external momentary short circuit is generated, the power supply through the normal power line may be impossible. In this case, the control means of UPS (not shown) blocks off the normal power line by turning off the output breaker CB3. Additionally, the control means (not shown) generates the bypass signal $S_{ITB}$ in order to change the power supply path from the normal power line to the bypass line by turning on the switch STS, CB4 of the bypass module 4.

In the meantime, the generated disorder is so serious that it may require an additional check-out or step by a user. However, sometimes, it can be just a temporary problem (for example, the temporary disconnection of a temperature sensor, the temporary fan disorder, and so on), that it can be automatically restored sooner or later.

Therefore, in case the power supply path is switched to the bypass line, the watchdog system of the present invention firstly performs the automatic recovery operation of the present invention which will be explained in the below. Additionally, in case the auto recovery is not performed, the checkout and manual recovery by a user can be performed like a related art.

Hereinafter, the automatic recovery operation of the present invention will be described.

In case the bypass signal $S_{ITB}$ is generated, the inverter-on generating unit 10 generates the inverter-on signal $S_{INV-ON}$ immediately or after a predetermined time to turn on again the inverter 2. At this time, the bypass signal $S_{ITB}$ and the inverter-on signal $S_{INV-ON}$ are also inputted to the recovery signal generating unit 20.

In case the inverter-on signal $S_{INV-ON}$ is generated, the inverter 2 performs the operation for the electric power supply, after being turned on again and passing through the initialization process. Such operation of the inverter 2 is identical with the operation when the inverter 2 is turned on again by the manual operation of the user of the related art.

At this time, since the counting comparison signal $S_{COUNT-COMP}$ is not yet generated (low level), another input signal $S_{STOP}$ of the recovery signal generating unit 20 maintains the high level state as shown in FIG. 3.

Therefore, the recovery signal generating unit 20 generates the recovery signal $S_{RECO}$ for changing again the power supply path from the bypass line to the normal power line with a high level since three input signals are all applied with a high level. UPS recovers the power supply path from the bypass line to the normal power line by the recovery signal $S_{RECO}$ outputted in the recovery signal generating unit 20. And the recovery signal $S_{RECO}$ is applied to the counter unit 30.

The counter unit 30 generates the accumulation count signal $S_{COUNT}$ having the magnitude of 1V since the recovery signal SRECO was generated for the first time. As the accumulation count signal $S_{COUNT}$ having the magnitude of 1V is smaller than the reference value $S_{REF}$ (for example, 2.5V), the counting comparison signal $S_{COUNT-COMP}$ still maintains the low level state. Therefore, the recovery stop signal $S_{STOP}$ still maintains the high level state. However, since the bypass signal $S_{ITB}$ is switched to the low level due to the generation of the recovery signal $S_{RECO}$, the recovery signal $S_{RECO}$ is switched again to the low level. And the delay count signal $S_{COUNT-DLY}$ still maintains the low level state for the delay time by the delay unit 54, although the accumulation count signal $S_{COUNT}$ is generated.

Like this, in case the disorder generated in the inverter 2 is still maintained although the inverter 2 is compulsively turned on again by the inverter on signal $S_{INV-ON}$ and the power supply path is restored again to the normal power line by the recovery signal $S_{RECO}$, the UPS switches again the power supply path to the bypass line by generating again the bypass signal $S_{ITB}$.

And then, as described above, the inverter-on generating unit 10 generates again the inverter-on signal $S_{INV-ON}$, and, accordingly, as shown in FIG. 3, the recovery signal generating unit 20 generates again the recovery signal $S_{RECO}$. That is, the recovery signal $S_{RECO}$ is generated twice.

As the recovery signal $S_{RECO}$ is generated again, the counter unit 30 increases the magnitude of the accumulation count signal $S_{COUNT}$ to 2V and outputs. However, being the accumulation count signal $S_{COUNT}$ of 2V is also smaller than the reference value $S_{REF}$ (for example, 2.5V), the counting comparison signal $S_{COUNT-COMP}$ still maintains the low level state. Accordingly, the recovery stop signal $S_{STOP}$ still maintains the high level state. However, since the bypass signal $S_{ITB}$ is switched to the low level due to the generation of the recovery signal $S_{RECO}$, the recovery signal $S_{RECO}$ is switched again to the low level.

At this time, in case the disorder generated in the UPS is temporary and is automatically restored, the UPS normally operates again. For example, in FIG. 2, in case the contact signal $S_{NOR}$ of the temperature sensor is normally generated again, the counter unit 30 is reset by the contact signal $S_{NOR}$ and the counting operation is interrupted.

In FIG. 2, the counter unit 30 is reset in case the contact signal $S_{NOR}$ of the temperature sensor is generated. However, in case the power supply through the normal power line is possible although the contact signal $S_{NOR}$ Of the temperature sensor is not continuously generated, the counting operation does not need to be continued. That is, by applying the accumulation count signal $S_{COUNT}$ to the OR gate after making a time delay of the accumulation count signal $S_{COUNT}$, the delay unit 54 resets the counter unit 30 in case the bypass signal $S_{ITB}$ is not generated again within a predetermined time. Accordingly, the accumulation count signal $S_{COUNT}$ is transmitted to a low level.

Thereafter, the watchdog system of the present invention discontinues the automatic recovery operation until a disorder is generated again in UPS and the bypass signal SITB is generated.

In FIG. 2, the counter unit 30 made to be reset according to the contact signal $S_{NOR}$ of the temperature sensor, however, it is just an embodiment of the present invention. By using the experience or the statistics, an application by the user is possible for the temperature sensor and/or the instrument to which a temporary disorder is expected.

FIG. 4 is a timing diagram showing the auto recovery operation process according to the present invention, in case the recovery signal SRECO is consecutively generated three times. That is, the automatic recovery operation according to the present invention is shown in case that the disorder of the UPS is not temporary.

In FIG. 3, it is described that the recovery signal $S_{RECO}$ is generated only two times and, thereafter, the bypass signal $S_{ITB}$ is not generated again, so that the recovery operation is not performed any more. However, in spite of the recovery operation of two times, the bypass signal $S_{ITB}$ can be generated again.

That is, in case the disorder generated in the inverter 2 is still maintained even when the inverter 2 is compulsively turned on twice since the inverter-on signal $S_{INV-ON}$ and the recovery signal $S_{RECO}$ has been generated twice, the UPS generates again the bypass signal $S_{ITB}$.

And then, the inverter-on generating unit 10 once again generates the inverter-on signal $S_{INV-ON}$, and accordingly, the recovery signal generating unit 20 once again generates the recovery signal $S_{RECO}$. That is, the recovery signal $S_{RECO}$ is generated three times.

Like this, in case the recovery signal $S_{RECO}$ is generated three times, the counter unit 30 generates the accumulation count signal $S_{COUNT}$ of 3V. Accordingly, the comparator COMP1 generates the counting comparison signal $S_{COUNT-COMP}$ with a high level to output. And the counting comparison signal $S_{COUNT-COMP}$ is time-delayed by the delay unit 42 and applied to the J/K flip flop 52.

Any one of differential signal ($\overline{Q}$) of the J/K flip flop 52, that is, the recovery stop signal $S_{STOP}$ is switched to the low level as the counting comparison signal $S_{COUNT-COMP}$ is switched to the high level. Accordingly, the recovery signal generating unit 20 generates the recovery signal SRECO with the low level. At the same time, since another differential signal (Q) of the J/K flip flop 52 is outputted with the high level, the reset signal $S_{RST}$ is generated and the counting operation of the counter unit 30 is interrupted.

That is, in the present embodiment, in case the power supply path is switched to the bypass line, firstly the auto recovery operation is consecutively performed three times. Nevertheless, in case the recovery has not been performed, it is determined that the UPS has an important disorder, so that the recovery operation is not performed any more. In this case, the manual recovery by a user is performed like a related art.

FIG. 5 is a timing diagram showing the auto recovery operation process according to the present invention, in case the recovery signal $S_{RECO}$ is consecutively generated five times.

Compared with FIG. 4, this embodiment shows that the automatic recovery operation is paused in case the recovery signal $S_{RECO}$ is consecutively generated five times during a given time by enhancing the reference value $V_{REF}$ of the counting comparison unit 40, for example, to 4.5V. That is, the number of the automatic recovery operation can be controlled by controlling the reference value $V_{REF}$.

The description of the auto recovery principles of this embodiment is omitted since it is identical with FIG. 4.

The invention claimed is:

1. An uninterruptible power supply (UPS) watchdog system that compulsively recovers a power supply path to a normal power line for a preset number of times, in case the power supply path is switched from the normal power line to a bypass line, wherein the UPS watchdog system comprises:
    an inverter-on generating unit that generates an inverter-on signal for turning on an inverter of the UPS in case a bypasss signal is generated;
    a recovery signal generating unit that generates a recovery signal for changing the power supply path from the bypass line to the normal power line according to the bypass signal, the inverter-on signal and a recovery stop signal,
    a counter unit that outputs an accumulation count signal of a magnitude corresponding to a number of occurrences of the recovery signal;
    a counting comparison unit that generates a counting comparison signal in case the magnitude of the accumulation count signal is greater than a preset reference value; and
    a recovery stop unit that controls the generation of the recovery stop signal reset signal for stopping the counter unit from counting when the counting comparison signal is generated.

2. The UPS watchdog system of claim 1, wherein the counter unit increases the magnitude of the accumulation count signal in proportion to the number of occurrences of the recovery signal with a given magnitude.

3. The UPS watchdog system of claim 2, wherein the recovery stop unit generates both the recovery stop signal and the reset signal in case the counting comparison signal is generated.

4. The UPS watchdog system of claim 3, wherein the recovery signal generating unit stops the generation of the recovery signal in case the recovery stop signal is generated when the bypass signal and the inverter-on signal are generated.

5. The UPS watchdog system of claim 1, wherein the recovery stop unit generates the reset signal in case a given time has elapsed after the accumulation count signal is generated, regardless of the generation of the counting comparison signal.

6. The UPS watchdog system of claim 1, wherein the recovery stop unit includes:
    a J/K flip flop that outputs a differential signal according to the counting comparison signal;
    a delay unit that makes a preset time delay of the accumulation count signal; and
    a logical operation unit that outputs the reset signal to the counter unit in case at least one of a first differential signal having the same phase as the counting comparison signal among the differential signals and the output signal of the delay unit is generated.

7. The UPS watchdog system of claim 6, wherein the J/K flip flop outputs a second differential signal having the opposite phase to the counting comparison signal among the differential signals as recovery stop signal.

8. An uninterruptible power supply (UPS) auto recovery method that compulsively recovers a power supply path to a normal power line for a preset number of times, in case the power supply path is switched from the normal power line to a bypass line, wherein the USP auto recovery method comprises:
    a first step of determining whether a power supply path of an UPS is switched from a normal power line to a bypass line;
    a second step of turning on an inverter of the UPS and switching the power supply path back to the normal power line from the bypass line, in case the power supply path is switched to the bypass line; and
    a third step of repeatedly performing the first and the second steps until the number of switching to the bypass line reaches a preset number.

9. The UPS auto recovery method of claim 8, wherein, in the first step, the generation of the bypass signal for switching the power supply path from the normal power line to the bypass line in the UPS is determined.

10. The UPS auto recovery method of claim 9, wherein, in the third step, the number of occurrence of the recovery signal for switching the power supply path from the bypass line to the normal power line is counted, and the first and the second step is repeatedly performed until the number of occurrence reaches the preset number for a given time.

11. The UPS auto recovery method of claim 10, wherein, in the third step, the generation of the recovery signal is paused in case the number of occurrence of the recovery signal reaches the preset number or the bypass signal is not generated after the recovery signal occurrence.

* * * * *